United States Patent
Kim (10) Patent No.: US 10,571,885 B2
(45) Date of Patent: Feb. 25, 2020

(54) METHOD FOR CONTROLLING MOTOR DRIVING BY PLC

(71) Applicant: LSIS CO., LTD., Anyang-si, Gyeonggi-do (KR)

(72) Inventor: Seok-Yeon Kim, Anyang-si (KR)

(73) Assignee: LSIS CO., LTD., Anyang-si, Gyeonggi-Do (KR)

(*) Notice: Subject to any disclaimer, the term of this patent is extended or adjusted under 35 U.S.C. 154(b) by 0 days.

(21) Appl. No.: 16/223,661

(22) Filed: Dec. 18, 2018

(65) Prior Publication Data

US 2019/0339664 A1    Nov. 7, 2019

(30) Foreign Application Priority Data

May 3, 2018   (KR) .................. 10-2018-0051264

(51) Int. Cl.
*G05B 19/05*    (2006.01)
*H02P 8/14*     (2006.01)

(52) U.S. Cl.
CPC .............. *G05B 19/05* (2013.01); *H02P 8/14* (2013.01); *G05B 2219/13001* (2013.01)

(58) Field of Classification Search
CPC ...... H02P 1/00; H02P 1/04; H02P 1/24; H02P 1/26; H02P 1/42; H02P 1/46; H02P 1/465;

(Continued)

(56) References Cited

U.S. PATENT DOCUMENTS 4,568,866 A * 2/1986 Floro ................. G05B 19/4147
                                                    318/561
8,504,176 B2 * 8/2013 Kobayashi ........... G05B 19/056
                                                    700/275

(Continued)

FOREIGN PATENT DOCUMENTS

EP          2515189 A1    10/2012
EP          2680095 A1    1/2014

(Continued)

OTHER PUBLICATIONS

European Search Report for related European Application No. 18214259.6; dated Jun. 28, 2019; (7 pages).

(Continued)

*Primary Examiner* — Antony M Paul
(74) *Attorney, Agent, or Firm* — K&L Gates LLP (57) ABSTRACT

The present disclosure provides a method for controlling driving of a motor by a Programmable Logic Controller (PLC). In one embodiment, the method includes: upon an initiation of an N-th position determination control period, stopping a scan program being executed; receiving one or more motor driving commands for one or more axes during a preset position control processing region; calculating one or more axis-based motor movement amounts corresponding to the one or more motor driving commands for the one or more axes during a preset position control calculation region; resuming execution of the scan program; and upon an initiation of a (N+1)-th position determination control period, driving the motor based on the one or more axis-based motor movement amounts calculated during the position control calculation region.

5 Claims, 8 Drawing Sheets

(58) Field of Classification Search
CPC .... H02P 1/54; H02P 6/00; H02P 6/002; H02P 6/005; H02P 6/006; H02P 8/005; H02P 8/02; H02P 8/08; H02P 8/24; H02P 3/18; H02P 9/009; H02P 21/00; H02P 21/146; H02P 23/00; H02P 23/005; H02P 23/0081; H02P 2/0086; H02P 23/065; H02P 27/00; H02P 27/04; H02P 27/06; H02P 2203/00; H02P 2203/11; G05B 19/418; G05B 19/408; G05B 19/10; G05B 11/01; G05B 13/00; G05B 19/19; B25J 9/18; B25J 5/00
USPC ... 318/567, 568.1, 560, 561, 568.11, 568.12, 318/568.13, 568.23, 569, 574, 600, 34, 318/37, 38, 700, 701, 727
See application file for complete search history.

(56) References Cited

U.S. PATENT DOCUMENTS 9,891,610 B2 * 2/2018 Shimamura .......... G05B 19/056

2007/0229015 A1 * 10/2007 Yoshida ................ B25J 9/1676
318/568.21
2019/0049924 A1 * 2/2019 Oya ...................... G05B 19/418
2019/0051049 A1 * 2/2019 Shimakawa ........ G06F 9/45508

FOREIGN PATENT DOCUMENTS

| JP | S6031604 A | 2/1985 |
| JP | 05-160193 | 6/1993 |
| JP | 2003519858 A | 6/2003 |
| JP | 2005346740 A | 12/2005 |
| JP | 2010170435 A | 8/2010 |
| KR | 20160135061 A | 11/2016 |
| KR | 20160141936 A | 12/2016 |

OTHER PUBLICATIONS

Japanese Office Action for related Japanese Application No. 2018-240005; action dated Nov. 22, 2019; (4 pages).

* cited by examiner

METHOD FOR CONTROLLING MOTOR DRIVING BY PLC

CROSS-REFERENCE TO RELATED APPLICATIONS

Pursuant to 35 U.S.C. § 119(a), this application claims the benefit of earlier filing date and right of priority to Korean Application No. 10-2018-0051264 filed on May 3, 2018, the disclosure of which is incorporated herein by reference in its entirety.

BACKGROUND

1. Technical Field

The present disclosure relates to a method for controlling motor driving by a Programmable Logic Controller (PLC).

2. Description of the Related Art

A position control technique using a motor is utilized in various fields such as industrial automation equipment, especially semiconductor processing, LCD manufacturing, and the like. Equipment using such a motor is generally controlled by a positioning module of a Programmable Logic Controller (PLC) or a motion control card of a PC. In particular, when controlling a driving of a motor performing a multi-axis motion by the PLC, a movement amount of a motor must be calculated for each axis.

Generally, the PLC repeatedly executes a scan program prepared in advance by a user. Further, the PLC calculates a movement amount of a motor for each axis separately from the execution of the scan program.

Figure 1:
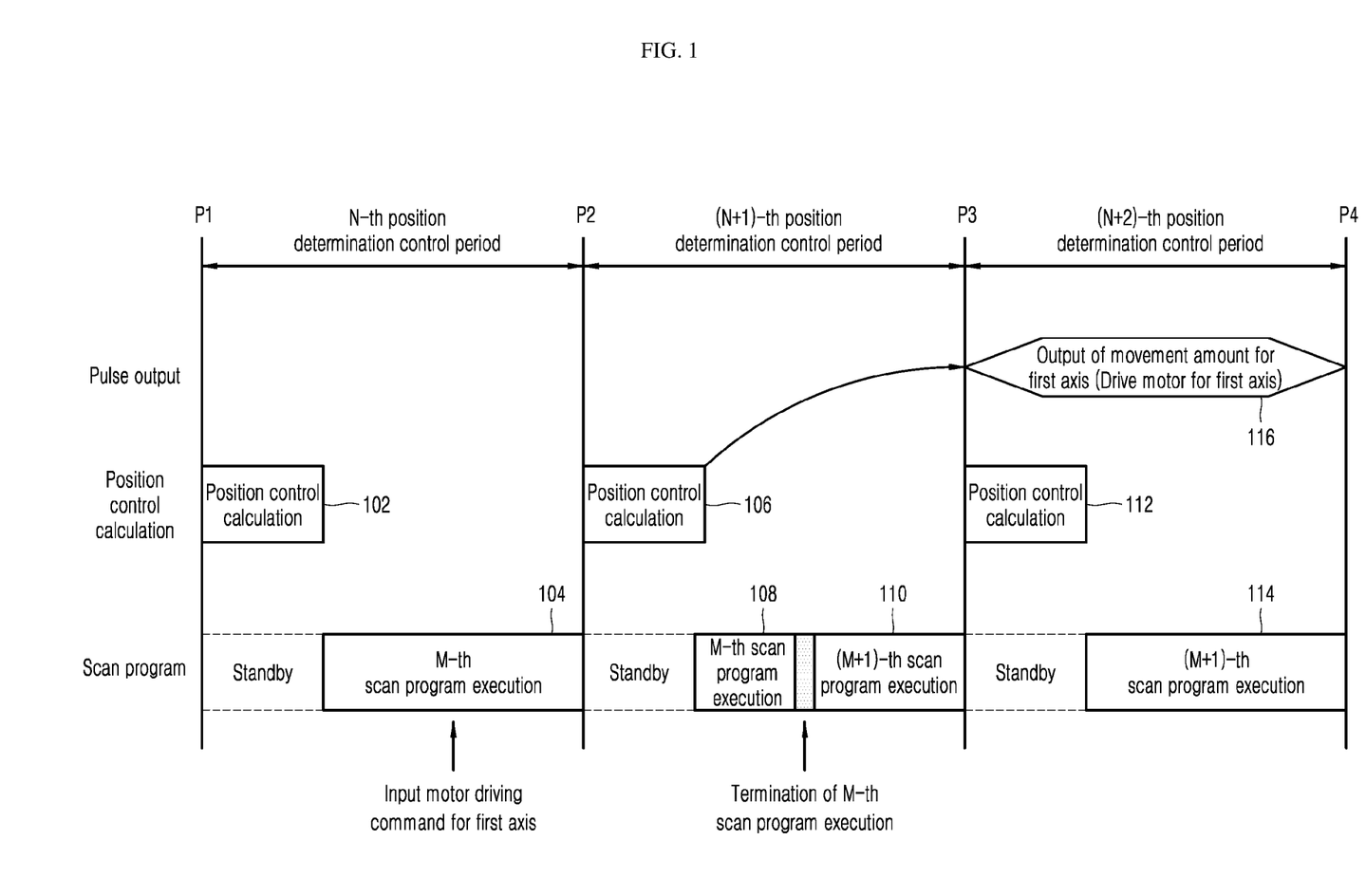
FIG. 1 is a flow chart showing a process for controlling motor driving by a PLC according to the prior art.

FIG. 1 is a flow chart showing a process for controlling motor driving by a PLC according to the prior art.

The PLC according to the related art controls various equipment by performing a pre-written scan program. Further, the PLC according to the related art performs a position control calculation separately from the scan program, to calculate a movement amount of a motor for each axis according to a driving command.

According to the related art, an execution period of the scan program is set to be different from an execution period of a position control calculation. As shown in FIG. 1, the position control calculation is performed periodically in accordance with a preset position determination control period. For example, when a position control calculation region 102 starts at a start point P1 of a N-th position determination control period, the scan program is stopped. Thereafter, when the position control calculation region 102 ends, a M-th scan program 104 is performed.

As shown in FIG. 1, while a M-th scan program 104 is being performed in a N-th position determination control period P1 to P2, a driving command for a motor of a first axis may also be entered. Then, with a start of a next position determination control period, that is, a (N+1)-th position determination control period P2 to P3, an execution of the M-th scan program is temporarily stopped, and is in a standby state, a position control calculation 106 is started first.

During the position control calculation region 106, a movement amount of a motor with respect to the first axis corresponding to the driving command for the first axis input via the M-th scan program 104 is calculated. When the position control calculation region 106 is terminated, an execution of the M-th scan program as previously interrupted is restarted 108. When the execution of the M-th scan program is terminated, an execution of the (M+1)-th scan program starts 110.

When a (N+2)-th position determination control period P3 to P4 starts while the (M+1)-th scan program is not yet terminated, the execution of the (M+1)-th scan program is interrupted and a position control calculation 112 is preferentially performed.

In the (N+2)-th position determination control period P3 to P4, the PLC outputs 116, in a pulse form, a calculation result from the position control calculation region 106 in the (N+1)-th position determination control period, that is, the movement amount of the motor with respect to the first axis calculated via the position control calculation region 106. In response, the motor corresponding to the first axis is driven. When the position control calculation region 112 is terminated, the execution of the (M+1)-th scan program that was previously interrupted resumes 114.

As a result, according to the related art, when the driving command for the motor of the first axis is input in the N-th position determination control period P1 to P2, the movement amount of the motor with respect to the first axis is calculated in the (N+1)-th position determination control period P2 to P3, and, then, the actual motion of the motor with respect to the first axis is achieved in the (N+2)-th position determination control period P3 to P4.

As described above, the PLC according to the related art preferentially performs the position control calculation in the preset position determination control period. After the position control calculation is completed, the PLC performs the scan program.

Figure 2:
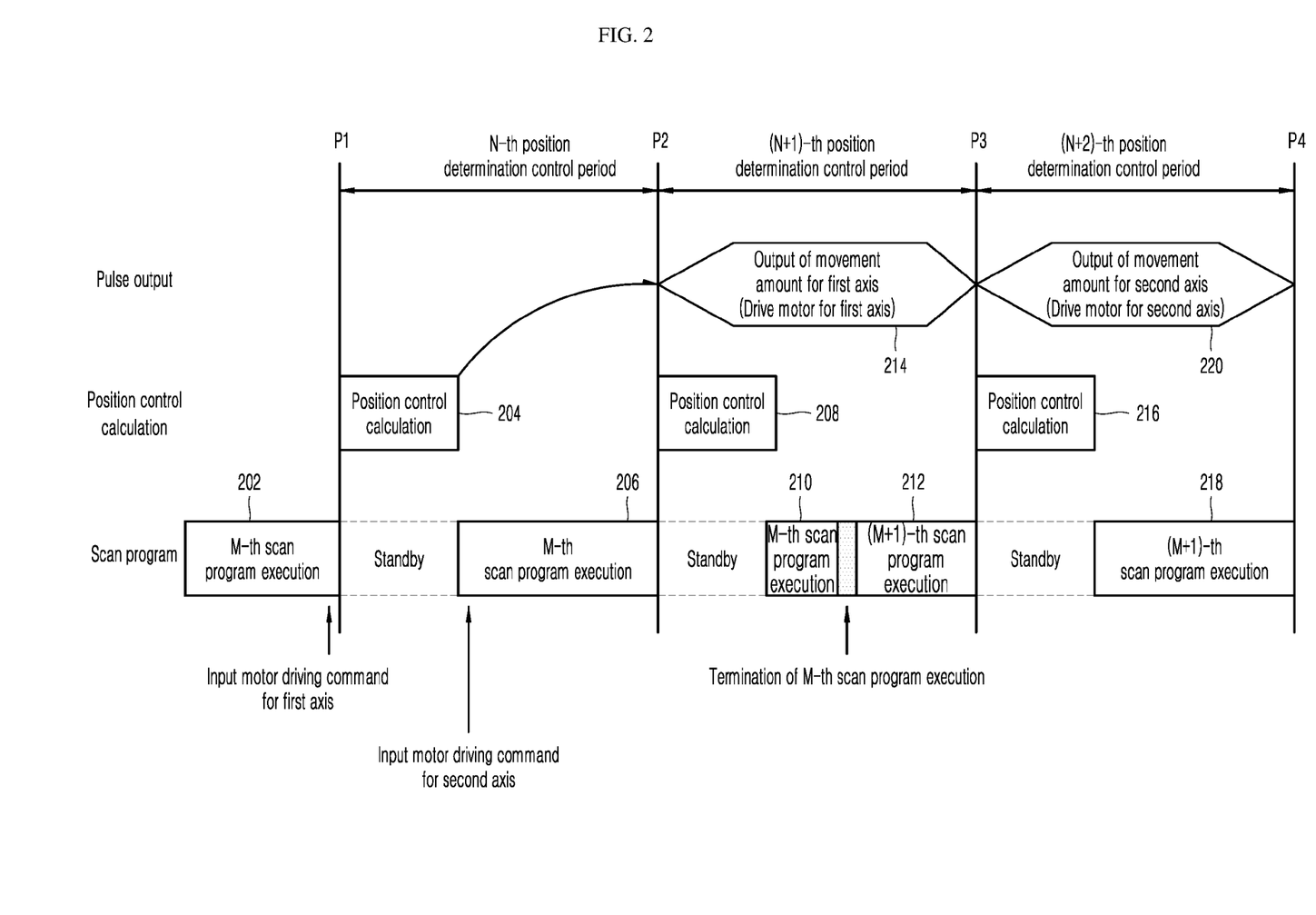
FIG. 2 is a flow chart illustrating a process for controlling a driving of a multi-axis motor by a PLC according to the prior art.

FIG. 2 is a flow chart illustrating a process for controlling a driving of a multi-axis motor by a PLC according to the prior art.

The process for controlling the driving of the motor by the PLC as described above may also be applied to the control of the driving of the motor that performs multi-axis based motion. FIG. 2 shows a process for controlling the driving of the motor by the PLC, wherein this process controls driving commands for multiple axes sharing the same control time-point, that is, driving commands for first and second axes to be controlled at the same timing.

As shown in FIG. 2, there may occur a situation that before a start point P1 of a N-th position determination control period, and while a M-th scan program is being performed, a driving command for the first axis is input, and during the N-th position determination control period P1 to P2, a driving command for the second axis is input.

In this case, a amount of movement of a motor relative to the first axis corresponding to the driving command for the first axis is calculated via a position control calculation region 204 in the N-th position determination control period P1 to P2. However, a movement amount of a motor relative to the second axis is calculated via a position control calculation region 208 in a (N+1)-th position determination control period P2 to P3, not the N-th position determination control period P1 to P2.

When the movement amount of the motor with respect to the first axis and the movement amount of the motor with respect to the second axis are calculated via different position control calculation regions, the amount of movement of the motor relative to the first axis and the amount of movement of the motor relative to the second axis are output in a pulse form at different position determination control periods 214 and 216, respectively, as shown in FIG. 2. Accordingly, a difference occurs between the driving time-point of the motor corresponding to the first axis and the driving time-point of the motor corresponding to the second axis.

Figure 3:
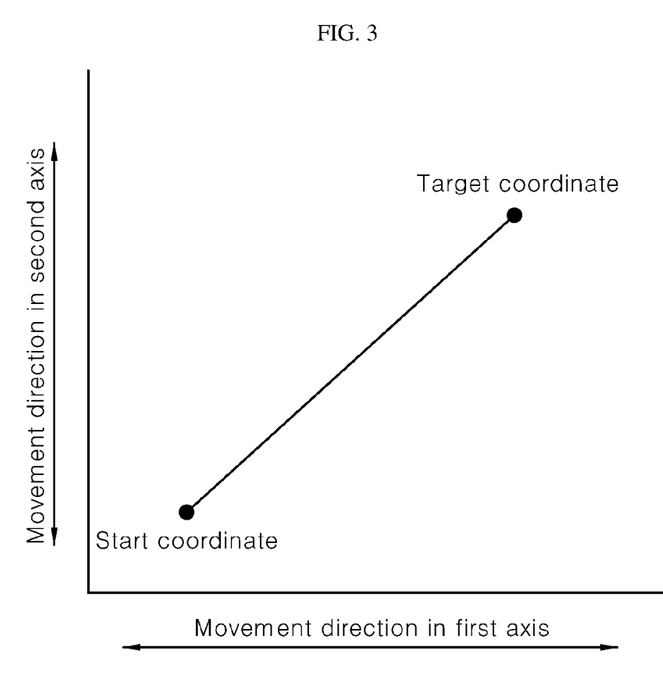
FIG. 3 shows a travel path of to-be-controlled equipment connected to a motor when motions of the motor for a first axis and a second axis are performed at the same time-point.

FIG. 3 shows a travel path of to-be-controlled equipment (e.g., robot arm) connected to the motor when the motions of the motor for the first axis and the second axis are performed at the same time-point. Further, FIG. 4 shows a travel path of the to-be-controlled equipment connected to the motor, when, as shown in FIG. 2, the motions of the motor for the first axis and the second axis are performed at different time-points.

When, as shown in FIG. 3, the movement amount of the motor with respect to the first axis and the movement amount of the motor with respect to the second axis are calculated via the same position control calculation region, and, thus, the driving time-point of the motor corresponding to the first axis coincides with the driving time-point of the motor corresponding to the second axis, the to-be-controlled equipment connected to the motor has the most ideal travel path.

Figure 4:
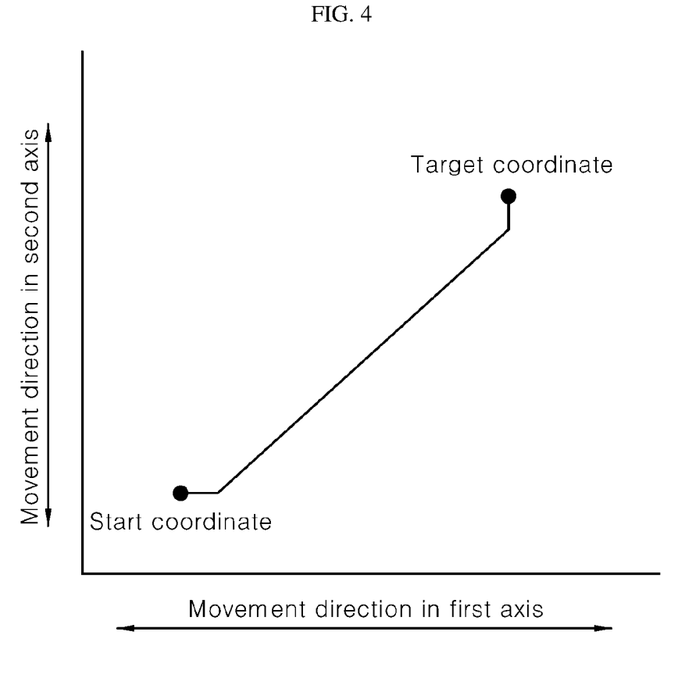
FIG. 4 shows a travel path of the to-be-controlled equipment connected to the motor, when the motions of the motor for the first axis and the second axis are performed at different time-points.

However, when, as shown in FIG. 2, the movement amount of the motor with respect to the first axis and the movement amount of the motor with respect to the second axis are calculated via different position control calculation regions, and, thus, a difference occurs between the driving time-point of the motor corresponding to the first axis and the driving time-point of the motor corresponding to the second axis, the movement of the driving direction of the second axis is further delayed as compared to the movement of the driving direction of the first axis as shown in FIG. 4, In this case, the to-be-controlled equipment connected to the motor may have a travel path deviating from the ideal travel path.

SUMMARY

The present disclosure aims to provide a method for controlling a driving of a motor by a PLC, by which, when controlling the motor that performs multi-axis motion, to-be-controlled equipment connected to the motor may be prevented from moving along an abnormal path, by maintaining axis-based driving time-points of the motor according to axis-based driving commands to coincide with each other.

The purposes of the present disclosure are not limited to the above-mentioned purposes. Other purposes and advantages of the present disclosure, as not mentioned above, may be understood from the following descriptions and more clearly understood from the embodiments of the present disclosure. Further, it will be readily appreciated that the objects and advantages of the present disclosure may be realized by features and combinations thereof as disclosed in the claims.

In one aspect of the present disclosure, there is provided a method for controlling driving of a motor by a programmable logic controller (PLC), the method comprising: upon an initiation of an N-th position determination control period, stopping a scan program being executed; receiving one or more motor driving commands for one or more axes during a preset position control processing region; calculating one or more axis-based motor movement amounts corresponding to the one or more motor driving commands for the one or more axes during a preset position control calculation region; resuming execution of the scan program; and upon an initiation of a (N+1)-th position determination control period, driving the motor based on the one or more axis-based motor movement amounts calculated during the position control calculation region.

In one embodiment, the position control processing region may have a higher priority than the position control calculation region or the scan program execution region.

In one embodiment, the one or more motor driving commands for the one or more axes may be input only during the position control processing region.

In one embodiment, driving the motor based on the one or more axis-based motor movement amounts calculated during the position control calculation region may include: simultaneously issuing the one or more motor driving commands for the one or more axes based on the one or more axis-based motor movement amounts calculated during the position control calculation region.

In one embodiment, the one or more motor driving commands for the one or more axes may be input as a task separate from the scan program during PLC program creation.

In accordance with the present disclosure, when controlling the motor that performs multi-axis motion, the to-be-controlled equipment connected to the motor may be prevented from moving along an abnormal path by maintaining the axis-based driving time-points of the motor according to the axis-based driving commands to coincide with each other.

Further specific effects of the present disclosure as well as the effects as described above will be described in conduction with illustrations of specific details for carrying out the invention.

DETAILED DESCRIPTION

The above objects, features and advantages will become apparent from the detailed description with reference to the accompanying drawings. Embodiments are described in sufficient detail to enable those skilled in the art in the art to easily practice the technical idea of the present disclosure. Detailed descriptions of well-known functions or configurations may be omitted in order not to unnecessarily obscure the gist of the present disclosure. Hereinafter, embodiments of the present disclosure will be described in detail with reference to the accompanying drawings. Throughout the drawings, like reference numerals refer to like elements.

Figure 5:
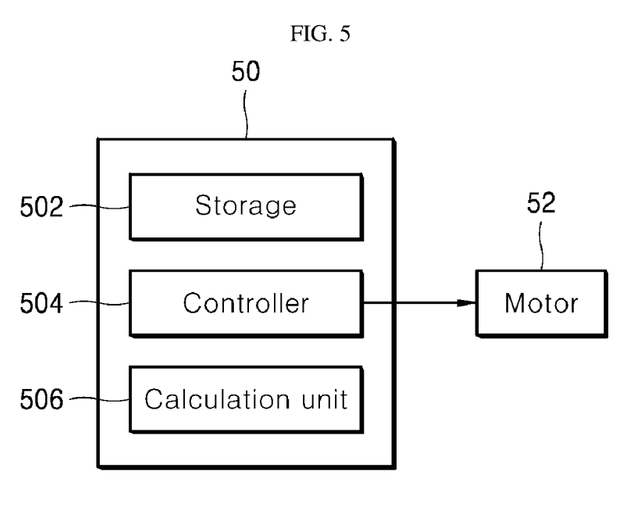
FIG. 5 is a schematic configuration diagram of a device for controlling driving of a motor by a PLC according to one embodiment of the present disclosure.

FIG. 5 is a schematic configuration diagram of a device for controlling driving of a motor by a PLC according to one embodiment of the present disclosure.

Referring to FIG. 5, a device 50 for controlling the driving of a motor by a PLC according to one embodiment of the present disclosure includes a storage 502, a controller 504, and a calculation unit 506.

The storage 502 stores programs, parameters, variables, and the like necessary for controlling the equipment including a motor 52 controlled by the PLC. In one embodiment of the present disclosure, the storage 502 stores a scan program for control of the to-be-controlled equipment. Further, in one embodiment of the present disclosure, the storage 502 stores driving commands for one or more axes entered as tasks separate from the scan program via software for creating PLC programs.

The controller 504 performs a scan program to control the equipment including the motor 52 controlled by the PLC. Further, the controller 504 performs an axis-based driving command of the motor 52 during the scan program execution. In order to perform the axis-based driving command, the controller 504 may refer to an axis-based movement amount of the motor as calculated by the calculation unit 506.

The calculation unit 506 calculates the axis-based movement amount of the motor for performing the axis-based driving command for controlling the motor 52 performed by the controller 504.

Hereinafter, with reference to FIG. 6 and FIG. 7, a procedure for controlling the driving of the motor by the PLC according to one embodiment of the present disclosure will be described.

Figure 6:
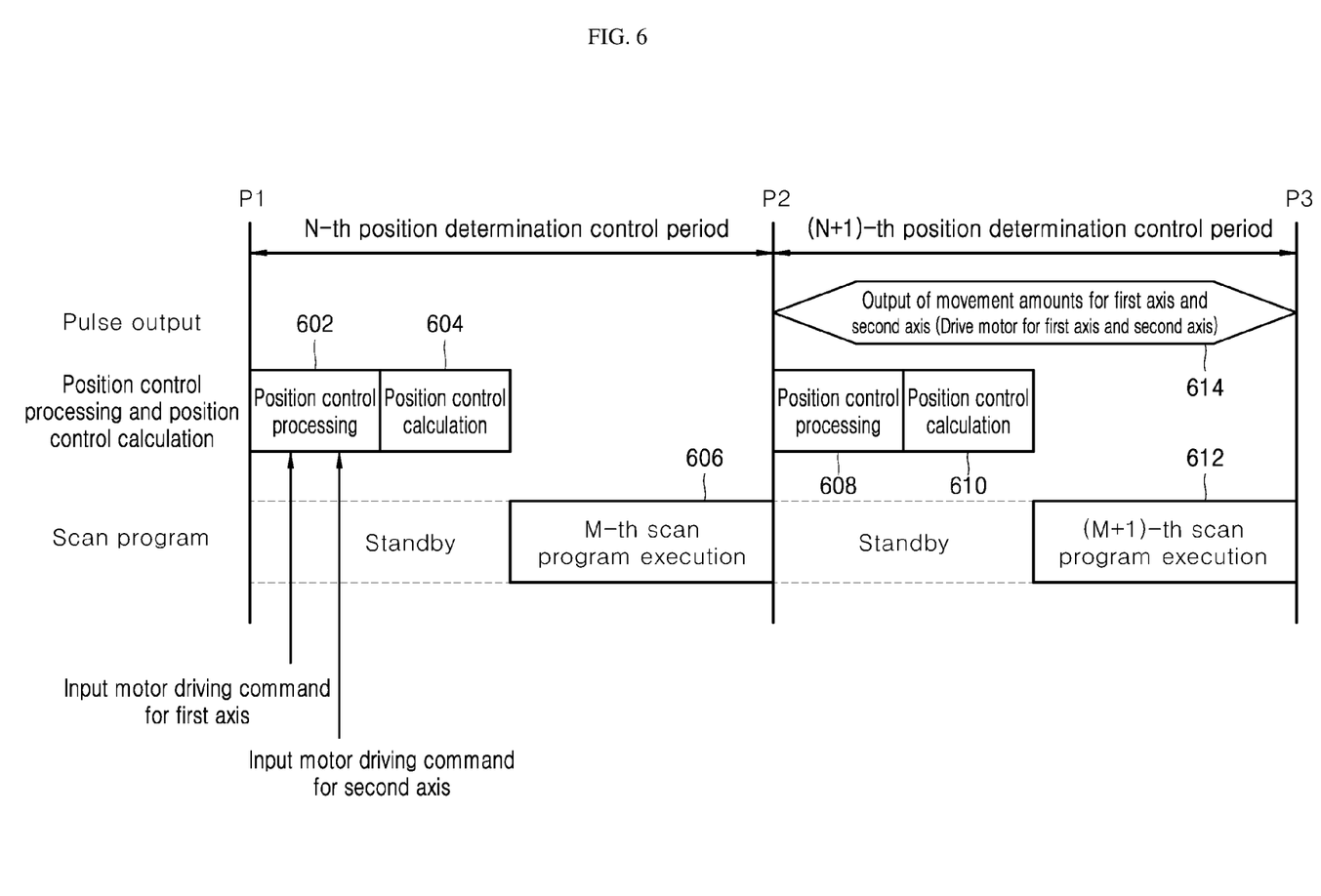
FIG. 6 is a flow chart showing a process for controlling the driving of the motor by the PLC according to one embodiment of the present disclosure.

FIG. 6 is a flow chart showing the process for controlling the driving of the motor by the PLC according to one embodiment of the present disclosure.

Referring to FIG. 6, the controller 504 performs position control processing and position control calculation in a preset position determination control period. Further, the controller 504 performs a scan program in a period different from the position determination control period.

First, when a N-th position determination control period P1 to P2 is started, the controller 504 interrupts the execution of the previously executed scan program and performs the position control processing 602.

The controller 504 in accordance with the present disclosure receives one or more motor driving commands for one or more axes during the position control processing region 602.

For example, as shown in FIG. 6, the controller 504 receives a motor driving command for the first axis and a motor driving command for the second axis during the position control processing region 602, respectively. In some embodiments, one or more motor driving commands for one or more of the axes may be input in the position control processing region 602.

In the process of controlling the driving of the motor by the PLC according to the present disclosure, the motor driving commands for all axes are entered only via the single position control processing region 602 in the single position determination control period. Further, in the process of controlling the driving of the motor by the PLC according to the present disclosure, the position control processing region, which is the region in which all the axis-based driving commands are received, has a higher priority than the position control calculation region or the scan program execution region. Thus, all axis-based driving commands sharing the same control time-point may be prevented from being input at different position determination control periods, which, otherwise, may occur as shown in FIG. 2

Referring to FIG. 6, when the inputting of the motor driving commands for all axes via the position control processing region 602 has been completed, a position control calculation is performed by the calculation unit 506 604. In the position control calculation region 604, axis-based movement amounts corresponding to the motor driving commands for the axes input during the position control processing region 602 included in the same position determination control period, i.e., the N-th position determination control period may be calculated respectively. For example, during the position control calculation region 604, the amount of movement of the motor relative to the first axis corresponding to the motor driving command for the first axis and the amount of movement of the motor relative to the second axis corresponding to the motor driving command for the second axis previously, which are input via the position control processing region 602 may be calculated respectively by the calculation unit 506.

In the process of controlling the motor driving by the PLC according to the present disclosure, the axis-based movement amounts corresponding to the axis-based motor driving commands input in any position determination control period may be calculated in the same position determination control period. Thus, the motor driving commands for different axes are prevented from being input at different position determination control periods, which otherwise, occurs as shown in FIG. 2. Further, faster axis-based control may be realized.

Referring to FIG. 6, after the position control calculation region 604 is terminated. a M-th scan program is executed or resumed 606. When, during the execution of the M-th scan program, it reaches a start time-point P2 of a (N+1)-th position determination control period P2 to P3, the execution of the M-th scan program is aborted and position control processing begins. Although not shown in the drawing, during the position control processing region 608, other types of driving commands for the first and second axes, or a motor driving command for another axis may be input.

The position control processing region 608 is terminated, and then a position control calculation by the calculation unit 506 is performed 610. Thus, each motor movement amount corresponding to each axis-based driving command input during the position control processing region 608 is calculated. When the position control calculation region 610 is terminated, an execution of the M-th scan program that was previously interrupted is resumed 612.

In one example, during the (N+1)-th position determination control period P2 to P3, a calculation result from the position control calculation region 604 in the previous N-th position determination control period P1 to P2, that is, the movement amount of the motor with respect to the first axis and the movement amount of the motor with respect to the second axis are output in a pulse form. In response, the controller 504 drives the motor 52 such that the to-be-controlled equipment connected to the first and second axes simultaneously moves based on the amount of movement of the motor relative to the first axis and the amount of movement of the motor relative to the second axis as calculated during the position control calculation region 604.

According to the present disclosure, the controller 504 simultaneously issues one or more motor driving commands for one or more axes based on one or more axis-based motor movement amounts calculated during the position control calculation region 604 in the N-th position determination control period. As a result, the to-be-controlled equipment connected to the motor 52 always travels along the ideal path as shown in FIG. 3.

Figure 7:
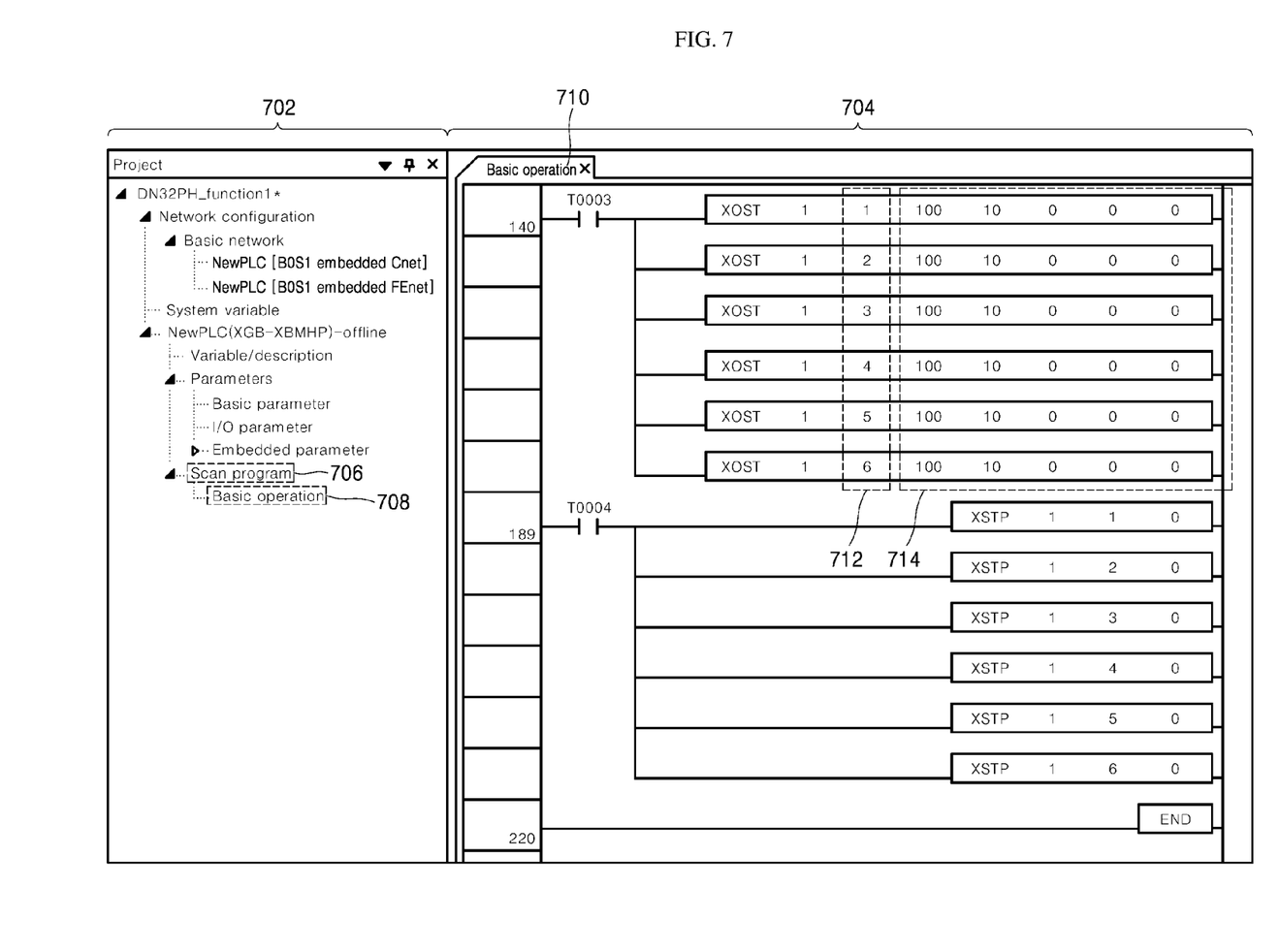
FIG. 7 shows a program creation screen that appears when executing a software for PLC program creation according to the prior art.

FIG. 7 shows a program creation screen that appears when executing software for PLC program creation according to the prior art.

PLC program creation is done on a separate project unit basis. Thus, an user who wants to create a new PLC program opens a new project file.

When executing software for PLC program creation according to the prior art, a project tree window 702 and a program creation window 704 are displayed on the screen as shown in FIG. 7.

In the project tree window 702, information about a network configuration included in the corresponding project and program information included in the corresponding project are displayed as a tree structure. The user may set or change variables, parameters, and the like to be used in the PLC program via the project tree window 702.

When the setting of the variable or parameter is completed, the user selects a scan program item 706 and creates each scan program constituting the PLC program. The scan program is generated on a separate task basis and is managed as a sub-item of the scan program item 706. In FIG. 7, a process of creating a scan program named "basic operation" by the user is shown.

When the user creates a new scan program named the basic operation, a basic operation item 708 as a new task is created as a sub-item of the scan program item 706, as shown in FIG. 7. When the user selects the basic operation item 708, the program creation window 704 displays a scan program creation tab 710 for creating a basic operation scan program.

As shown in FIG. 7, the user designates, via the scan program creation tab 710, six axes as to-be-controlled objects 712. The user then defines a parameter 714 for motor driving for each axis. Such to-be-controlled objects 712 and parameters 714 may constitute the axis-based motor driving commands as described above.

That is, according to the prior art, as shown in FIG. 7, the axis-based motor driving commands are included as a portion of the scan program. Accordingly, the axis-based motor driving commands are input to the controller 504 in response to driving the scan program in an independent manner of the position determination control periods, as shown in FIG. 2.

Figure 8:
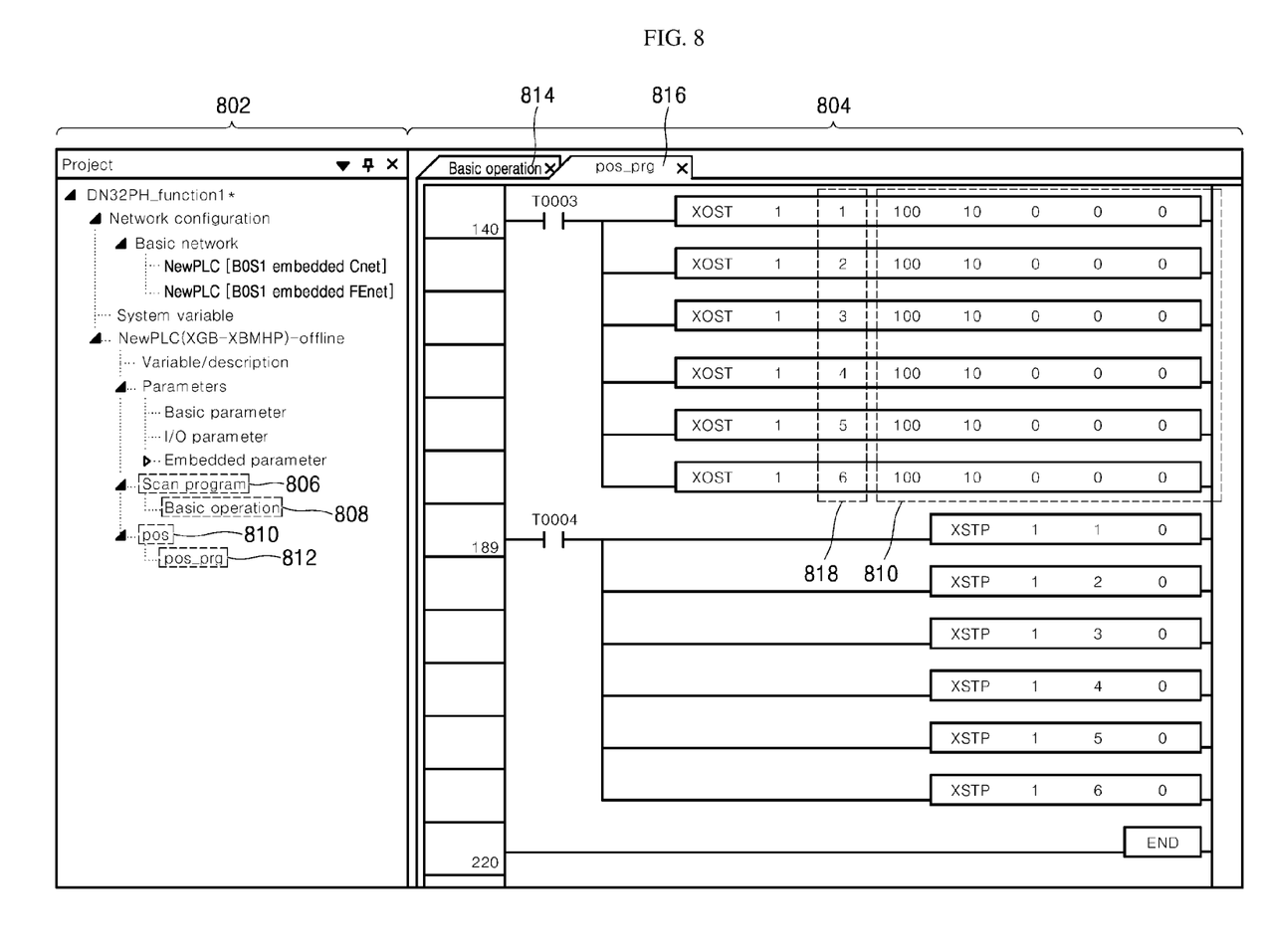
FIG. 8 shows a program creation screen that appears when executing a software for PLC program creation according to the present disclosure.

FIG. 8 shows a program creation screen when a software is run for PLC program creation according to the present disclosure.

As shown in FIG. 8, when executing the software for PLC program creation according to the present disclosure, a project tree window 802 and a program creation window 804 are displayed on the screen, respectively as in the prior art. Further, according to the present disclosure, in the project tree window 802, a scan program item 806 and an item corresponding to a scan program task as created by the user, such as a basic operation item 808, are displayed.

In one example, according to the present disclosure, the user may enter the axis-based motor driving commands into the controller as a separate task from the scan program, which is not a portion of the scan program. A task for inputting the axis-based motor driving commands is referred to as a position control processing task. In the project tree window 802 of FIG. 8, the position control processing task item is indicated as a pos item 810.

The user may select the pos item 810 and create a new position control processing task, e.g., a 'pos_prg' task. The thus-created pos_prg item 812 may be managed as a sub-item of the pos item 810.

When the user selects the pos_prg item 812, a position control processing task creation tab 816 for creating the 'pos_prg' task is displayed as shown in FIG. 8. The user inputs the to-be-controlled objects 818 and parameters 820 that constitute the axis-based motor driving commands via the position control processing task creation tab 816.

The axis-based motor driving commands input via the position control processing task creation tab 816 are stored in the storage 502 as a position control processing task separate from the scan program. Accordingly, in the course of performing the driving control for the motor 52, the controller performs the position control processing task stored in the storage 502 separately from the scan program during the position control processing regions 602 and 608, as shown in FIG. 6. In this way, the axis-based motor driving commands are not input to the controller 504 during the execution period of the scan program, but are input to the controller 504 only during position control processing regions 602 and 608.

The foregoing disclosure is subject to various substitutions, modifications, and alterations by those skilled in the art to which the present disclosure belongs, without departing from the technical idea of the present disclosure. Therefore, the present disclosure is not limited to the above-described embodiment and the accompanying drawings.

What is claimed is:

1. A method for controlling driving of a motor by a programmable logic controller (PLC), the method comprising:
   upon an initiation of an N-th position determination control period, stopping a scan program being executed;
   receiving one or more motor driving commands for one or more axes during a preset position control processing region;
   calculating one or more axis-based motor movement amounts corresponding to the one or more motor driving commands for the one or more axes during a preset position control calculation region;
   resuming execution of the scan program; and
   upon an initiation of a (N+1)-th position determination control period, driving the motor based on the one or more axis-based motor movement amounts calculated during the position control calculation region.

2. The method of claim 1, wherein the position control processing region has a higher priority than the position control calculation region or the scan program execution region.

3. The method of claim 1, wherein the one or more motor driving commands for the one or more axes are input only during the position control processing region.

4. The method of claim 1, wherein driving the motor based on the one or more axis-based motor movement amounts calculated during the position control calculation region includes:
   simultaneously issuing the one or more motor driving commands for the one or more axes based on the one or more axis-based motor movement amounts calculated during the position control calculation region.

5. The method of claim 1, wherein the one or more motor driving commands for the one or more axes are input as a task separate from the scan program during PLC program creation.

\* \* \* \* \*